(12) United States Patent
Roberts et al.

(10) Patent No.: US 6,764,780 B2
(45) Date of Patent: *Jul. 20, 2004

(54) METHOD AND APPARATUS FOR INCREASING THE TEMPERATURE OF A FUEL CELL

(75) Inventors: Joy Roberts, Coquitlam (CA); Marian van der Geest, Vancouver (CA); Jean St-Pierre, Vancouver (CA); David P. Wilkinson, North Vancouver (CA); Alvin Lee, Vancouver (CA); Stephanie Moroz, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,693

(22) Filed: Mar. 30, 2001

(65) Prior Publication Data
US 2001/0028967 A1 Oct. 11, 2001

Related U.S. Application Data (60) Division of application No. 09/345,667, filed on Jun. 30, 1999, now Pat. No. 6,329,089, which is a continuation-in-part of application No. 08/998,133, filed on Dec. 23, 1997, now Pat. No. 6,096,448, and a continuation-in-part of application No. 09/344,763, filed on Jun. 25, 1999, now Pat. No. 6,472,090.

(51) Int. Cl.[7] ................................................ H01M 8/04
(52) U.S. Cl. .......................................... 429/13; 429/24
(58) Field of Search ............................. 429/13, 22, 24, 429/30

(56) References Cited

U.S. PATENT DOCUMENTS 3,300,345 A   1/1967   Lyons
3,379,572 A   4/1968   Gay (List continued on next page.)

FOREIGN PATENT DOCUMENTS

| CA | 2282434   | 9/1998  |
|----|-----------|---------|
| EP | 0 018 693 | 11/1980 |
| EP | 0 692 835 | 1/1996  |
| EP | 0 701 294 | 3/1996  |
| EP | 0 710 996 | 5/1996  |
| EP | 0 736 921 | 10/1996 |
| GB | 1296831   | 11/1972 |
| GB | 2 290 409 | 12/1995 |
| JP | 63-26961  | 2/1988  |
| JP | 63-170865 | 7/1988  |
| JP | 7-302607  | 11/1995 |

(List continued on next page.)

OTHER PUBLICATIONS

M.L. Kronenberg, Final Report: "Study Program To Improve Fuel Cell Performance By Pulsing Techniques," National Aeronautics and Space Administration, (Aug. 31, 1965), Union Carbide Corporation, Development Department, Parma Research Laboratory, Parma, Ohio.

(List continued on next page.)

Primary Examiner—Bruce F. Bell
Assistant Examiner—Jonathan Crepeau
(74) Attorney, Agent, or Firm—McAndrews, Held & Malloy, Ltd.

(57) ABSTRACT

A method and apparatus increase the temperature of a fuel cell via reactant starvation at one or both electrodes. Reactant starvation at an electrode results in increased internal heat generation under load. Starvation conditions can be prolonged or intermittent and can be obtained, for example, by suitably reducing the supply rate of a reactant or by operating the fuel cell at sufficiently high current density so as to consume reactant faster than it is supplied. The method can allow for some generation of useful power by the fuel cell during start-up. The method is particularly suitable for starting up a solid polymer electrolyte fuel cell from temperatures below 0° C.

16 Claims, 8 Drawing Sheets

U.S. PATENT DOCUMENTS

| | | | |
|---|---|---|---|
| 4,243,731 A | 1/1981 | Cheron | 429/13 |
| 4,279,711 A | 7/1981 | Vining et al. | 204/105 R |
| 4,294,892 A | 10/1981 | Alfenaar | 429/13 |
| 4,420,544 A | 12/1983 | Lawson et al. | 429/13 |
| 4,555,452 A | 11/1985 | Kahara et al. | 429/13 |
| 4,810,595 A | 3/1989 | Kahara et al. | 429/16 |
| 4,910,099 A | 3/1990 | Gottesfeld | 429/13 |
| 5,432,021 A | 7/1995 | Wilkinson et al. | 429/17 |
| 5,436,086 A | 7/1995 | Seymour et al. | 429/17 |
| 5,482,680 A | 1/1996 | Wilkinson et al. | 422/177 |
| 5,601,936 A | 2/1997 | Dudfield et al. | 429/13 |
| 5,677,073 A | 10/1997 | Kawatsu | 429/22 |
| 5,789,092 A | 8/1998 | Spiers et al. | 429/24 |
| 5,798,186 A | 8/1998 | Fletcher et al. | 429/13 |
| 6,068,941 A | 5/2000 | Fuller et al. | 429/13 |
| 6,096,448 A * | 8/2000 | Wilkinson et al. | 429/13 |
| 6,472,090 B1 * | 10/2002 | Colbow et al. | 429/13 |

FOREIGN PATENT DOCUMENTS

| | | |
|---|---|---|
| JP | 10-270065 | 10/1998 |
| WO | WO 95/18469 | 7/1995 |
| WO | WO 98/42038 | 9/1998 |
| WO | WO 99/34465 | 7/1999 |
| WO | WO 99/59217 | 11/1999 |

OTHER PUBLICATIONS

M.L. Kronenberg and K.V. Kordesch, "Effects of Heavy Discharge Pulsing on Fuel Cell Electrodes," Electrochemical Technology, (Sep.–Oct. 1966), pp. 460–464, Union Carbide Corporation, Development Department, Parma Research Laboratory, Parma, Ohio.

R.A. Sanderson, C.L. Bushnell, and T.F. McKiernan, "Pulsed Power Fuel Cells," (1967) pp. 58–69, Pratt & Whitney Aircraft Division, United Aircraft Corporation, East Hartford, Connecticut.

T.J. Gray, A.A. Schneider, R.B. Rozelle and M.L. Soeder, "Fuel Cell: Research An Investigation Of Non–Steady–State Operation," National Aeronautics and Space Administration, (1965), Alfred, New York.

* cited by examiner

METHOD AND APPARATUS FOR INCREASING THE TEMPERATURE OF A FUEL CELL

CROSS-REFERENCE TO RELATED APPLICATION(S)

This application is a division of U.S. patent application Ser. No. 09/345,667, now U.S. Pat. No. 6,329,089, filed Jun. 30, 1999 entitled "Method and Apparatus for Increasing the Temperature of a Fuel Cell". The '667 application is in turn a continuation-in-part of U.S. patent application Ser. No. 08/998,133, now U.S. Pat. No. 6,096,448, filed Dec. 23, 1997 entitled "Method and Apparatus for Operating an Electrochemical Fuel Cell With Periodic Fuel Starvation At The Anode". The '667 application is also a continuation-in-part of U.S. patent application Ser. No. 09/344,763, now U.S. Pat. No. 6,472,090 filed Jun. 25, 1999, entitled "Method and Apparatus for Operating an Electrochemical Fuel Cell With Periodic Reactant Starvation". The '667, '133 and '763 applications are each incorporated herein by reference in their entirety.

FIELD OF THE INVENTION

The present invention relates to a method and apparatus for increasing the temperature and for cold start-up of an electrochemical fuel cell using reactant starvation at an electrode. More particularly, the method comprises fuel starving at least a portion of the anode of an operational fuel cell or oxidant starving at least a portion of the cathode of an operational fuel cell or both to increase the temperature. The method may be used, for example, during start-up or during operation of the fuel cell when the temperature of the fuel cell is below the preferred operating temperature range. Thus, the method and apparatus may be used to heat the fuel cell and to prevent poisoning of electrode catalysts while allowing for some generation of power by the fuel cell during start-up.

BACKGROUND OF THE INVENTION

Electrochemical fuel cells convert reactants, namely fuel and oxidant fluid streams, to produce electric power and reaction products. Solid polymer electrochemical fuel cells generally employ a membrane electrode assembly ("MEA") comprising a solid polymer electrolyte or ion-exchange membrane disposed between two porous electrically conductive electrode layers. The anode and cathode each comprise electrocatalyst, which is typically disposed at the membrane/electrode layer interface, to induce the desired electrochemical reaction.

At the anode, the fuel moves through the porous anode layer and is oxidized at the electrocatalyst to produce protons and electrons. The protons migrate through the ion exchange membrane towards the cathode. On the other side of the membrane, the oxidant moves through the porous cathode and reacts with the protons at the cathode electrocatalyst. The electrons travel from the anode to the cathode through an external circuit, producing an electrical current.

Electrochemical fuel cells can operate using various reactants. For example, the fuel stream may be substantially pure hydrogen gas, a gaseous hydrogen-containing reformate stream, or methanol in a direct methanol fuel cell. The oxidant may be substantially pure oxygen or a dilute stream such as air containing oxygen.

In some applications, fuel cell systems may operate almost continuously (e.g., certain stationary power applications). However, in other applications, fuel cell systems may be subjected to frequent start and stop cycles and to prolonged storage periods in between (e.g., portable or traction power applications). Further, in colder climates, such fuel cell systems may frequently be subjected to temperatures below freezing. Such systems therefore must tolerate exposure to sub-zero temperatures without degradation. Additionally, the power output capability from fuel cells is typically very limited at temperatures well below the normal operating temperature. Thus, it is also desirable to be able to start up such systems and bring them up to normal operating temperature in a timely, energy efficient manner, and to maintain the temperature within a desirable range during operation.

A conventional approach for starting up a fuel cell is to employ an external power source (e.g., storage battery) or a heater to heat the fuel cell up to a temperature at which fuel cell operation is commenced. However, this requires additional equipment just for start-up purposes and generally requires a net input of energy during start-up. Problems encountered below freezing may simply be avoided by not allowing the fuel cell temperature to go that low. In many applications however, this is not practical. Another approach for low temperature start-up involves operating the fuel cell during start-up and using some of the power and heat generated within to bring the fuel cell up to normal operating temperature. For instance, U.S. Pat. No. 5,798,186 discloses a method for starting up a solid polymer fuel cell stack involving supplying power from the stack to an external load, and then increasing the power drawn and, optionally, the flow rate of the reactant streams while the stack warms up. Another starting method is disclosed in Japanese Patent Publication (Kokai) No. 07-302607, in which the contact resistance between components in the main body of a fuel cell is increased by reducing the pressure applied to the main body of the fuel cell. Internal energy losses are increased and thus the fuel cell temperature can be increased without using an external power source or heater.

A further complication during start-up of fuel cell systems relates to the possible presence of impurities in the reactant streams, particularly the fuel stream. The fuel stream may contain impurities known as electrocatalyst "poisons" which may adsorb or deposit on the anode electrocatalyst and inhibit the desired electrochemical reaction on the anode. The presence of poisons on the electrocatalyst thus results in reduced fuel cell performance. In the absence of countermeasures, the adsorption or deposition of electrocatalyst poisons may be cumulative, so even minute concentrations of poisons in a fuel stream, may for instance, over time, result in a degree of electrocatalyst poisoning which is detrimental to fuel cell performance. Further, the poisons may adsorb or bind more strongly at lower temperatures thereby aggravating the adverse effect on performance at lower temperature.

Reformate streams derived from hydrocarbons or oxygenated hydrocarbons typically contain a high concentration of hydrogen fuel, but typically also contain electrocatalyst poisons such as carbon monoxide. To reduce the effects of anode electrocatalyst poisoning, it is known to pre-treat the fuel supply stream prior to directing it to the fuel cell. For example, pre-treatment methods may employ catalytic or other methods to convert carbon monoxide to carbon dioxide. However, known pre-treatment methods for reformate streams cannot efficiently remove 100% of the carbon monoxide. Even trace amounts less than 10 ppm can eventually result in electrocatalyst poisoning, particularly at low temperatures. Further, during start-up of a reformate-supplied fuel cell system, the reformer and other related apparatus for pre-treatment must themselves also be started up and brought up to a desirable normal operating temperature. Typically, during start-up, the reformer and pre-treatment apparatus are not as effective in providing fuel with a low level of impurity. Thus, the level of poisons in the reformate is typically higher during start-up than it is at normal operating temperature.

It may be possible to remove electrocatalyst poisons by purging the affected electrode with an inert gas such as nitrogen or with a "clean" reactant stream containing substantially no poisons. Where the adsorption of the poison is reversible, an equilibrium process results in some rejuvenation of the electrocatalyst. However, this approach is not as effective against strongly bound adsorbed poisons and can be very slow. Due to the additional difficulties posed by electrocatalyst poisons during system start-up, often reformate is not supplied to a fuel cell system until both the reformer and fuel cell systems are close to the preferred normal operating temperature.

SUMMARY OF THE INVENTION

An improved method of heating a solid polymer electrolyte fuel cell employs reactant starvation over at least a portion of at least one of the fuel cell electrodes, thereby increasing the overvoltage at that portion. Additional heat generation takes place as a result of the starvation. The method is particularly useful for starting purposes in that it provides for faster start-up. The method allows for the provision of some electrical power output from the fuel cell during the starting period. The method is useful for heating or starting up fuel cells supplied with reactant streams that are essentially free of electrocatalyst poisons (e.g., a fuel reactant stream of pure hydrogen). However, the reactant starvation method can also serve to remove electrocatalyst poisons that are introduced in a reactant stream. Thus, the method is particularly useful for starting up fuel cells supplied with a reactant stream comprising an electrocatalyst poison.

For starting purposes, the method involves starting the fuel cell from a starting temperature below its normal operating temperature and the temperature of the fuel cell rises to the normal operating temperature over a starting period. The method comprises supplying an oxidant reactant stream to the cathode electrode of the fuel cell, supplying a fuel reactant stream to the anode electrode of the fuel cell, and reactant starving at least a portion of one of the electrodes during the starting period, thereby increasing the overvoltage of the portion of one of the electrodes and generating additional heat. The reactant starvation may be stopped before the normal operating temperature is reached once the fuel cell temperature has reached a predetermined threshold temperature.

For temperature regulation purposes generally during operation, the method involves operating the fuel cell while supplying an oxidant reactant stream to the cathode electrode of the fuel cell and a fuel reactant stream to the anode electrode of the fuel cell method. A temperature parameter is monitored that is indicative of the operating temperature of the fuel cell. When the temperature parameter is below a predetermined threshold value, at least a portion of one of said electrodes is starved of reactant thereby increasing the overvoltage of the portion of one of the electrodes and generating additional heat. The method may be used to effect a faster temperature correction when the fuel cell temperature falls below the threshold value during operation.

Reactant starvation involves a reduction in the reactant stoichiometry. As used herein, stoichiometry is defined as the ratio, at any given instant, of the rate at which reactant is supplied to the fuel cell divided by the rate at which the reactant is consumed in the electrochemical reactions in the fuel cell. A reactant starvation condition exists whenever the reactant stoichiometry is less than 1, that is whenever less reactant is being supplied to the fuel cell than is being consumed within the fuel cell at any given instant. Such a situation is temporary since the fuel cell cannot consume reactant faster than it is supplied indefinitely. If the rate at which reactant is supplied remains constant during a starvation, the rate at which reactant is consumed will fall until it eventually matches the rate supplied, i.e., the stoichiometry eventually increases to 1.

Reactant starvation may be accomplished by interrupting the supply of one of the reactant streams to the fuel cell electrodes, thereby reducing the rate at which reactant is supplied and hence the stoichiometry. A single, optionally prolonged, interruption may be employed or an intermittent series of interruptions may be employed. Intermittent interruptions may be regular or irregular. Alternatively, reactant starvation may be accomplished by connecting a transient electrical load to draw electrical power from the fuel cell. Again, the transient electrical load may be connected once or intermittently. To effect a starvation via this method, the rates of supply of the reactants to the fuel cell electrodes are not increased to match the increased electrical demand over conventional levels in response to the connection of the transient load. Thus, this method increases the rate at which reactant is consumed and hence decreases the stoichiometry.

Apparatus suitable for heating or starting a solid polymer electrolyte fuel cell comprises an oxidant supply system for directing an oxidant reactant stream to a cathode electrode of the fuel cell, a fuel supply system for directing a fuel reactant stream to an anode electrode of the fuel cell, a temperature sensor for detecting the temperature of the fuel cell, and a control system for starving at least one of the electrodes responsive to the output from the temperature sensor. The control system may comprise apparatus for intermittently interrupting the supply of one of the reactant streams to the fuel cell electrodes, or alternatively it may comprise apparatus for connecting a transient electrical load to draw electrical power from the fuel cell. Other apparatus for achieving reactant starvation is disclosed in the aforementioned U.S. patent applications Ser. No. 08/998,133 filed Dec. 23, 1997 entitled "Method and Apparatus for Operating an Electrochemical Fuel Cell With Periodic Fuel Starvation At The Anode" and U.S. patent application Ser. No. 09/344,763, filed Jun. 25, 1999, entitled "Method and Apparatus for Operating an Electrochemical Fuel Cell With Periodic Reactant Starvation".

An improved start-up may be obtained by starving at least a portion of either or both electrodes. Where electrocatalyst poisoning is also an issue, however, it is preferable to at least reactant starve the poisoned electrode (e.g., to starve the anode of a solid polymer fuel cell when supplied with a carbon monoxide containing reformate stream).

Where the fuel cell is one of a plurality of fuel cells, for example, arranged in a fuel cell stack, the method may preferably avoid the simultaneous starvation of each electrode of the plurality of fuel cells. This reduces the fluctuation in electrical power output from the stack. In fuel cell stacks, it is generally preferred to avoid voltage reversal in any of the cells. Nonetheless, it appears that a fuel cell may degrade less quickly as a result of a voltage reversal condition when it is at temperatures well below the normal operating temperature. Thus, the reactant starving method may cause a voltage reversal to occur in at least one, but preferably not simultaneously in all, of the plurality of fuel cells. Preferably, however, starvation is limited so that the voltage reversal is not prolonged.

The method is suitable for starting up a solid polymer electrolyte fuel cell and is particularly advantageous for starting up such cells from temperatures below the freezing point of water or 0° C. In solid polymer fuel cell systems supplied with a reformate fuel stream, the method provides for a shorter starting period while also reducing the effect of carbon monoxide, methanol, or other impurities on the anode electrocatalyst. The amount of water produced during starvation is also reduced, which may be advantageous in preventing blockages due to ice formation at temperatures below 0° C.

BRIEF DESCRIPTION OF THE DRAWINGS

The advantages, nature and additional features of the invention will become more apparent from the following description, together with the accompanying drawings, in which.

DETAILED DESCRIPTION OF PREFERRED EMBODIMENT(S)

A method for increasing the temperature of an electrochemical fuel cell uses reactant starvation techniques at an electrode. In the context of this disclosure, fuel starvation is defined as a reduction in fuel supply to the anode electrocatalyst which results in the anode potential increasing (that is, moving towards the cathode potential). In a like manner, oxidant starvation is defined as a reduction in oxidant supply to the cathode electrocatalyst which results in the cathode potential decreasing (that is, moving towards the anode potential). For a fuel cell normally supplied with fuel and oxidant reactants at certain flow rates for operation at a particular given current density, reactant starvation can be achieved by sufficiently reducing or interrupting a reactant flow rate such that the relevant electrode potential is affected. In this way, the reactant stoichiometry to the relevant electrode has been reduced. Alternatively, reactant starvation can also be achieved by increasing the current density such that the potential of the relevant electrode, or electrodes, is affected. This latter situation is equivalent to using reduced reactant stoichiometries for normal operation at the increased current density. In either case, starvation is evidenced by a change in electrode potential. The change in electrode potential represents an increase in the overvoltage of the electrode and consequently an increase in the amount of heat generated within the fuel cell at any given operating current density. This additional heat assists in bringing the fuel cell up to a preferred operating temperature quickly during the starting period or if it falls below the preferred operating temperature during operation. Further, while the method might be used in the absence of electrocatalyst poisons, starvation techniques are useful for the removal of such poisons from the reactant starved portions of the electrode. The method may also offer advantages by influencing water production or consumption and hence modify water management at an electrode.

Figure 1:
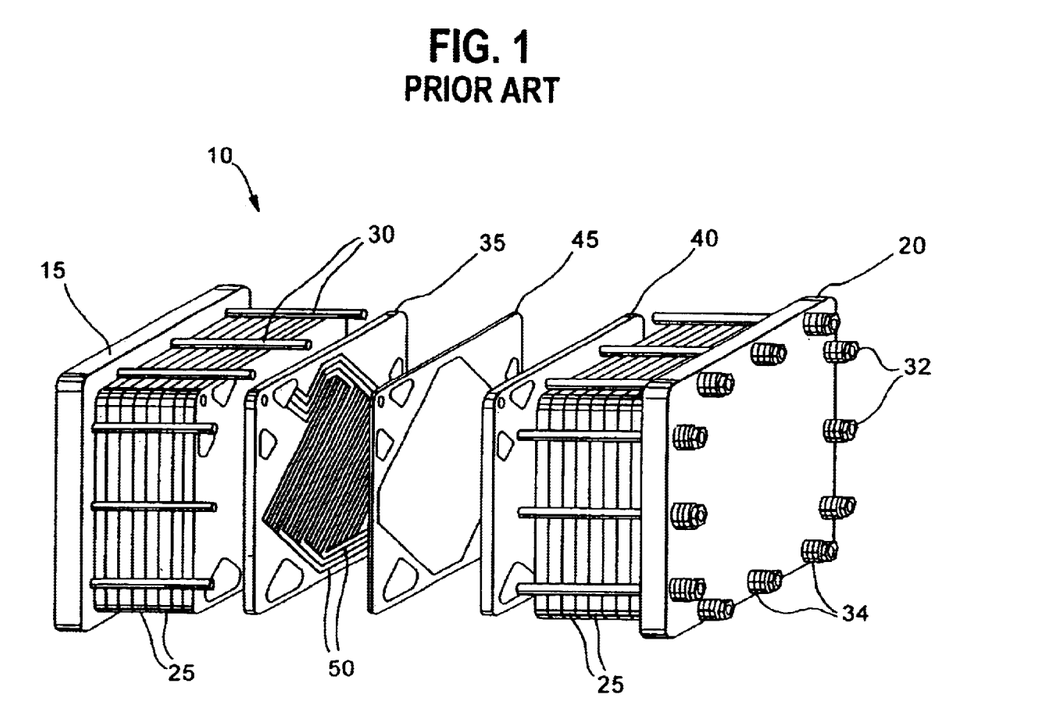
FIG. 1 is an exploded perspective view of a conventional, prior art fuel cell stack.

A solid polymer electrolyte fuel cell is a preferred fuel cell type for portable and traction applications. FIG. 1 illustrates, in exploded perspective view, a conventional solid polymer fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 threaded on tie rods 30 interposed between fastening nuts 32 and end plate 20 apply resilient compressive force to stack 10 in the longitudinal direction. Reactant and coolant fluid streams are supplied to and exhausted from internal manifolds and passages in stack 10 via inlet and outlet ports (not shown in FIG. 1) in end plate 15. As shown by the exploded portion of FIG. 1, each fuel cell assembly 25 includes an anode flow field plate 35, a cathode flow field plate 40, and a membrane electrode assembly (MEA) 45 interposed between plates 35 and 40. Each MEA comprises an anode electrode and a cathode electrode bonded on opposite sides of a proton conducting, solid polymer membrane electrolyte (not shown in FIG. 1).

Plates 35 and 40 act as current collectors and provide a fluid barrier for separating reactant fluids supplied to the anode and cathode. At the interface between MEA 45 and plates 35 and 40, fluid flow fields 50 direct the reactant fluids to the electrodes. Fluid flow field 50 typically comprises a plurality of fluid flow channels formed in the major surfaces of plates 35 and 40 facing MEA 45.

One purpose of fluid flow field 50 is to distribute the reactant fluid across the surface of the respective electrodes, namely the anode on the fuel side and the cathode on the oxidant side.

A method for increasing the temperature of a solid polymer fuel cell stack involves reactant starving at least a portion of a fuel cell electrode in the stack. A single starvation may be employed or starvation may be intermittent. In the case of the latter, starvation conditions may be introduced at regular intervals, or the duration and frequency thereof varied in accordance with a measured system parameter (e.g., cell voltages in order to avoid voltage reversals).

Starvation may be accomplished by closing or adjusting a valve in a reactant supply or exhaust line to the fuel cell so as to reduce the rate of reactant supply to be less than that demanded to satisfy the instantaneous load. The stack voltage drops as the reactant inside the stack is consumed by the electrochemical reaction which is induced to supply electrical current to the electrical load. The fuel cell electrodes thus become reactant starved. It is preferable to avoid causing sudden, large pressure differentials across the membranes in the MEAs. Thus, both a reactant inlet and an outlet line may be valved off simultaneously in order to avoid a sudden increase or decrease in the transmembrane pressure differential. Alternatively, other methods may be employed to reduce a reactant stoichiometry. For instance, pulses of a substantially reactant-free fluid (e.g., an inert gas) may be introduced into the reactant stream thereby diluting it and reducing stoichiometry.

Starvation may also be accomplished by connecting a transient load to the fuel cell stack, without correspondingly increasing the rate of reactant supply to either or both of the electrodes. (The reactant supply rates depend on the normal stoichiometry of each reactant.) The transient load demands more electrical current which can cause one or both reactants in the stack to be consumed more rapidly than the reactants are supplied.

Other apparatus and means for achieving reactant starvation conditions are disclosed in the two aforementioned related U.S. patent applications, Ser. No. 08/998,133 filed Dec. 23, 1997 entitled "Method and Apparatus for Operating an Electrochemical Fuel Cell With Periodic Fuel Starvation At The Anode" and Ser. No. 09/344,763, filed Jun. 25, 1999, entitled "Method and Apparatus for Operating an Electrochemical Fuel Cell With Periodic Reactant Starvation".

Several potential problems may be encountered when attempting to rapidly start up a solid polymer fuel cell stack in this manner. For example, voltage reversals may occur. Local high temperature conditions may exist within the cells due to non-uniform current distributions. Also, water related problems may arise, particularly when starting temperatures are below freezing.

A voltage reversal occurs in a cell when either the anode potential increases and becomes more positive than the cathode potential or the cathode potential decreases and becomes more negative than the anode potential, resulting in a negative cell voltage. In this situation the cell is consuming, rather than producing, electrical power. Momentary instances of slight cell reversal may not damage the fuel cell, but prolonged cell reversal or large negative cell voltages can cause permanent damage. In particular, cell reversal caused by fuel starvation may result in the anode potential rising to the point where significant corrosion of the anode hardware occurs. It has been found however, that at lower temperatures, the damage caused by a given voltage reversal situation is significantly reduced. Nonetheless, it may be preferable to introduce starvation conditions intermittently and to control the duration and frequency of the reactant starvations, using a suitable controller, to avoid prolonged cell voltage reversal.

Particularly when high current densities are employed during starting, local high temperature conditions or hot spots may exist in the MEAs in the cells. Such hot spots may damage the membrane electrolyte. As illustrated in the following examples however, solid polymer fuel cell stacks may be effectively shorted for several minutes at low starting temperatures without causing significant membrane damage, yet providing for a rapid start-up.

Water management issues can arise with regards to storage and start-up, particularly for temperatures below freezing. A certain amount of water is present and is required during the normal operation of solid polymer fuel cells. Along with electricity, water is produced at the cathode by the primary electrochemical reaction of the fuel cell. Also, an adequate water level must generally be maintained at the membrane electrolyte for it to provide satisfactory proton conduction. This is frequently accomplished by humidifying one or both incoming reactant streams. Additionally, water is often required for the proper functioning of the anode electrocatalyst. For example, fuel cells that are intended to operate on reformate generally employ an anode electrocatalyst that is relatively tolerant to carbon monoxide, such as a Pt/Ru alloy. The tolerance to carbon monoxide generally originates with the ability of the electrocatalyst to promote a reaction between adsorbed carbon monoxide poison and adsorbed hydroxyl species, thereby removing the carbon monoxide poison.

When the fuel cell is shut down and stored below freezing, any water remaining inside will freeze, potentially causing physical damage and undesirable blockages. Thus, the amount of water remaining in the fuel cell is desirably minimized before storage. This may be accomplished, for example, by purging the reactant flow fields with dry gas during shutdown.

During start-up from sub-zero temperatures, any free residual water remaining in the fuel cell is typically frozen and not mobile. In addition, at such low temperatures, much less water can be introduced in the vapor phase via humidification of a reactant stream at low temperatures. Thus, there is significantly less water available for membrane humidification and reaction with carbon monoxide at an anode electrocatalyst (effectively resulting in less tolerance to carbon monoxide on certain electrocatalysts). During cold start-up, water generated at the cathode may freeze causing blockages. Excessive amounts of water introduced in a reactant stream may condense and freeze causing blockages in a like manner. Nonetheless, as illustrated in the following examples, solid polymer fuel cell stacks may be started up quickly on reformate from temperatures well below freezing where the reactant starvation method includes an effective shorting for several minutes.

Preferably during start-up, the fuel cell stack coolant (if present) is not circulated to allow rapid warming of the stack. As the stack nears its normal operating temperature, interior cells in the stack may overheat if no coolant flow is provided, but starting the flow of coolant can initiate a cell voltage reversal in the cooler outermost cells. Thus, care should be taken with the timing and rate at which coolant flow is commenced to avoid voltage reversal and/or overheating.

The starting period is finished when the fuel cell or stack reaches the lower limit of its normal or preferred operating temperature range. For a solid polymer fuel cell, this is typically of the order of 60–120° C. Suitable means may be used to detect a cell temperature parameter indicative of operating temperature (e.g., thermocouple) and to signal the end of the starting period.

EXAMPLES

The following examples illustrate certain aspects of the described method but should not be construed as limiting in any way.

A series of conventional solid polymer electrolyte fuel cells and fuel cell stacks (either a single cell or a seven cell series stack) were constructed and attempts were made to start them up from sub zero starting temperatures (either −5, −10 or −15° C.) using a variety of starting methods. The anodes and cathodes in each comprised supported platinum/ruthenium and platinum catalysts applied to carbon fiber substrates respectively. The membrane electrolyte employed in each was Nafion™. Compressed air was used as the oxidant supply. Several different fuel supplies were employed as indicated below. The fuels were either pure hydrogen gas, a methanol reformate mixture containing about 63.5% $H_2$, 22.5% $CO_2$, 13% $N_2$, 1% methanol and 40 ppm CO, a 64%/36% hydrogen/carbon dioxide gas mixture, or a 1% $CO/H_2$ gas mixture.

Each fuel cell or stack was operated briefly under "normal" conditions (e.g., at about 80° C.). The cell or stack was then shutdown and allowed to cool to room temperature. Both reactant flow fields were then purged with dry air or nitrogen for about 3 minutes to remove water from the cell/s. This reduces the amount of water that resides in the flow fields and that can freeze in pores in the fuel cell components, thus damaging them. The cell or stack was then placed in an environmental chamber and allowed to cool to the desired starting temperature.

To start up the cells or stacks, reactant gas flows were initiated that provide reactant stoichiometries (stoichiometry being defined as the ratio of reactant supplied to that consumed in the electricity generating reactions in the fuel cell) of approximately 3 at current densities of 0.5 A/cm$^2$ at normal operating temperature. The gas flows were not humidified at cell or stack temperatures below zero. Once above 0° C., the gas supplies were humidified. The cell or stack was then started up using different techniques while monitoring an interior temperature of the cell or stack along with the current density and the voltage of each cell. For start-up generally, the initial load was selected in a conventional attempt to maximize the initial output power from the cell or stack. In the following examples, typically this resulted in an initial voltage per cell of about 0.3–0.4 V under load. As the output power capability of the cell increased with time, the load was increased. In some cases (e.g., when using reformate), the cell voltage decreased with time as a result of poisoning in which case the load was reduced. The time taken to actually reach the 0.5 A/cm$^2$ operating current density was determined. The table below summarizes the tests performed and the time taken to reach the 0.5 A/cm$^2$ level.

In the following, reactant starvation via shorting was performed by connecting a low resistance relay across the fuel cell terminals thereby effectively shorting the cell to zero volts. (The relay was rated to handle 400 A at 600V and actually drew approximately 190 A from the 7-cell stacks at −15° C.). In some instances, a cell was shorted intermittently for one second on/one second off intervals using a timer and relay. Intermittent shorting continued until the cell temperature was about 20° C. In other instances at −5° C., a stack was shorted once during start-up, continuously, for a prolonged period of order of a few minutes long.

Also in the following, oxidant starvation was accomplished by intermittently interrupting the oxidant flow by simultaneously closing both the oxidant inlet and outlet lines using two solenoid valves. The duration of the oxidant flow interruptions was adjusted from about 10 to 60 seconds to try and see if higher cell voltages could be obtained.

| Cell or stack | # cells in stack | Starting temperature (° C.) | Fuel type | Starvation method used | Approx. time to 0.5 A/cm$^2$ (min) |
|---|---|---|---|---|---|
| A | 1 | −5 | H$_2$ | none | 5 |
| B | 1 | −5 | reformate | intermittent additional electrical load | 5 |
| C | 1 | −10 | H$_2$ | none | 120 |
| D | 1 | −10 | H$_2$/CO$_2$ | none | 210 |
| E | 7 | −10 | reformate | none | did not reach, max. ~0.2 A/cm$^2$ |
| F | 7 | −10 | reformate | oxidant interruption | did not reach, max. ~0.3 A/cm$^2$ |
| G | 7 | −15 | H$_2$ | none | 24 |
| H | 7 | −15 | H$_2$ | prolonged additional electrical load | 9 |
| I | 7 | −15 | reformate | prolonged additional electrical load | 11 |
| J | 7 | −15 | reformate | prolonged additional electrical load | 10 |

Start-up could be accomplished when using pure hydrogen as the fuel and no starvation methods at temperatures down to −15° C. However, while the time taken for a single cell (A) to reach a current density of 0.5 A/cm$^2$ from −5° C. was reasonable, the time taken for a single cell (C) from −10° C. was very long. However, this time was significantly reduced for a seven cell stack, as exemplified by stack G, presumably because individual cells in the stack insulate each other, resulting in a larger temperature rise for a given heat output per cell. In other words, cell stacks tend to warm up more easily than single cells.

Figure 2:
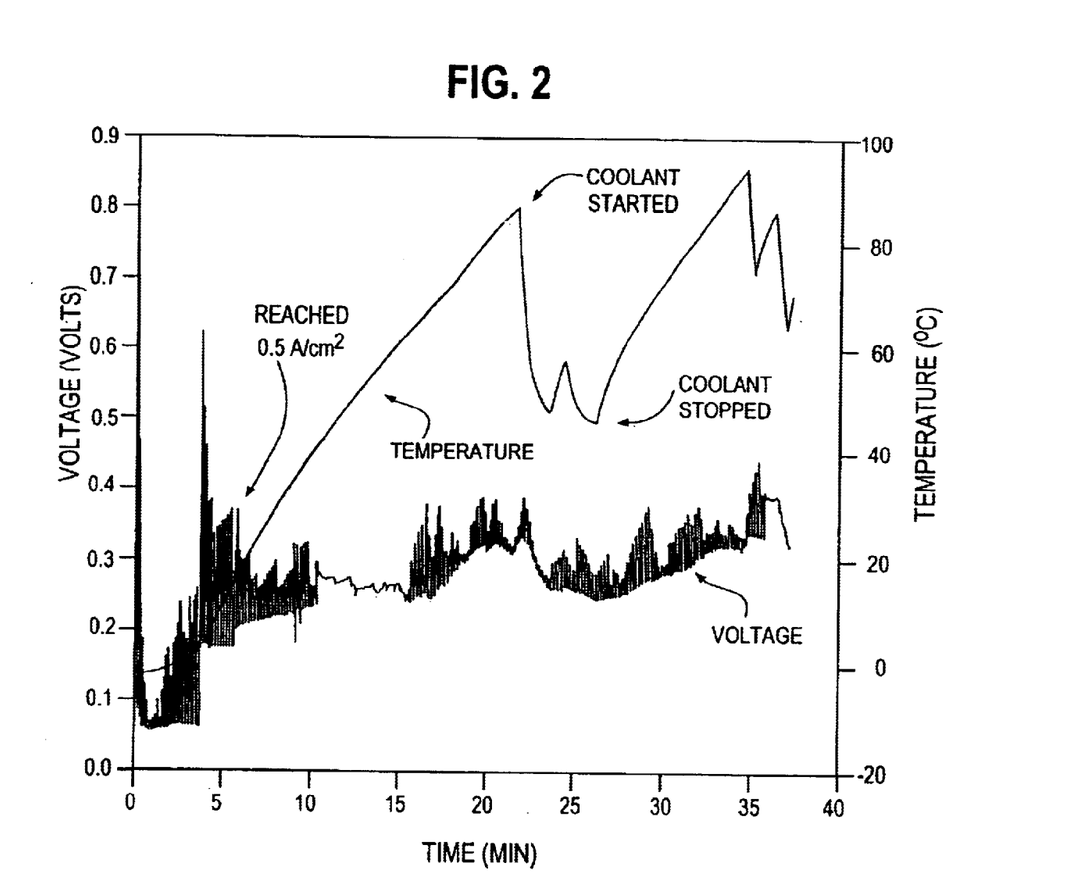
FIG. 2 is a plot of voltage and temperature as a function of time in a fuel cell started up from −5° C. using reformate as fuel and intermittent connection of an additional electrical load to effect starvation.

Using intermittent reactant starvation via shorting during the start-up period, cell B also reached a current density of 0.5 A/cm$^2$ from −5° C. in a reasonable length of time. FIG. 2 shows the voltage and temperature versus time for fuel cell B. In FIG. 2 only, the flow of coolant through the fuel cell began once the monitored temperature in the fuel cell reached 80° C. The starting temperature of the coolant was also −5° C. and the fuel cell was its only source of heat. Thus, introducing this relatively cold coolant precipitated the marked drop in interior temperature as seen in FIG. 2.

The problem with using reformate in these embodiments is illustrated by the results for cells C and D and stack E. Although it took about 2 hours, cell C eventually reached a current density of 0.5 A/cm$^2$ from −10° C. Stack E, on the other hand, was run for about 35 minutes and only achieved a maximum current density of 0.2 A/cm$^2$. (As indicated in the preceding, stack E would be expected to warm up more easily than a single cell under similar conditions.) The presence of carbon dioxide impurity in the fuel stream was detrimental, as illustrated by cell D, but it did eventually reach a current density of 0.5 A/cm$^2$ from −10° C. The severe effect that carbon monoxide has on performance at low temperature was demonstrated in another single cell supplied with an increased concentration of CO, a 1% CO/H$_2$ gas mixture (data not included in the table above). Starting up from −5° C. with no applied load (i.e., open circuit), an indication of a voltage appeared about 65 seconds after the reactant gas flows began. About 10 seconds later however, a positive voltage could not be detected for this cell using a standard voltmeter.

Figure 3A:
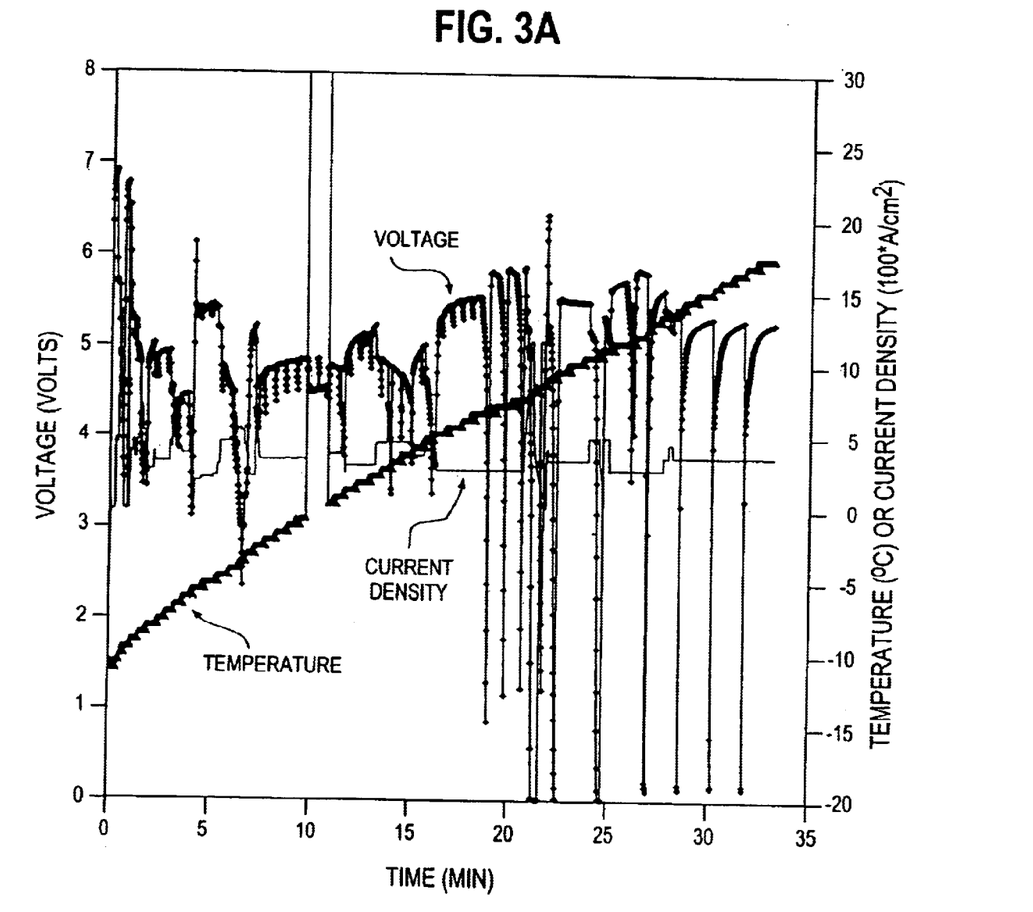
FIGS. 3A and 3B are plots of representative cell voltages, current densities, and temperatures as a function of time in fuel cells in 7-cell stacks started up from −10° C. using reformate as fuel and (in plot A) an intermittent oxidant starvation method and (in plot B) no starvation method, respectively.
Figure 3B:
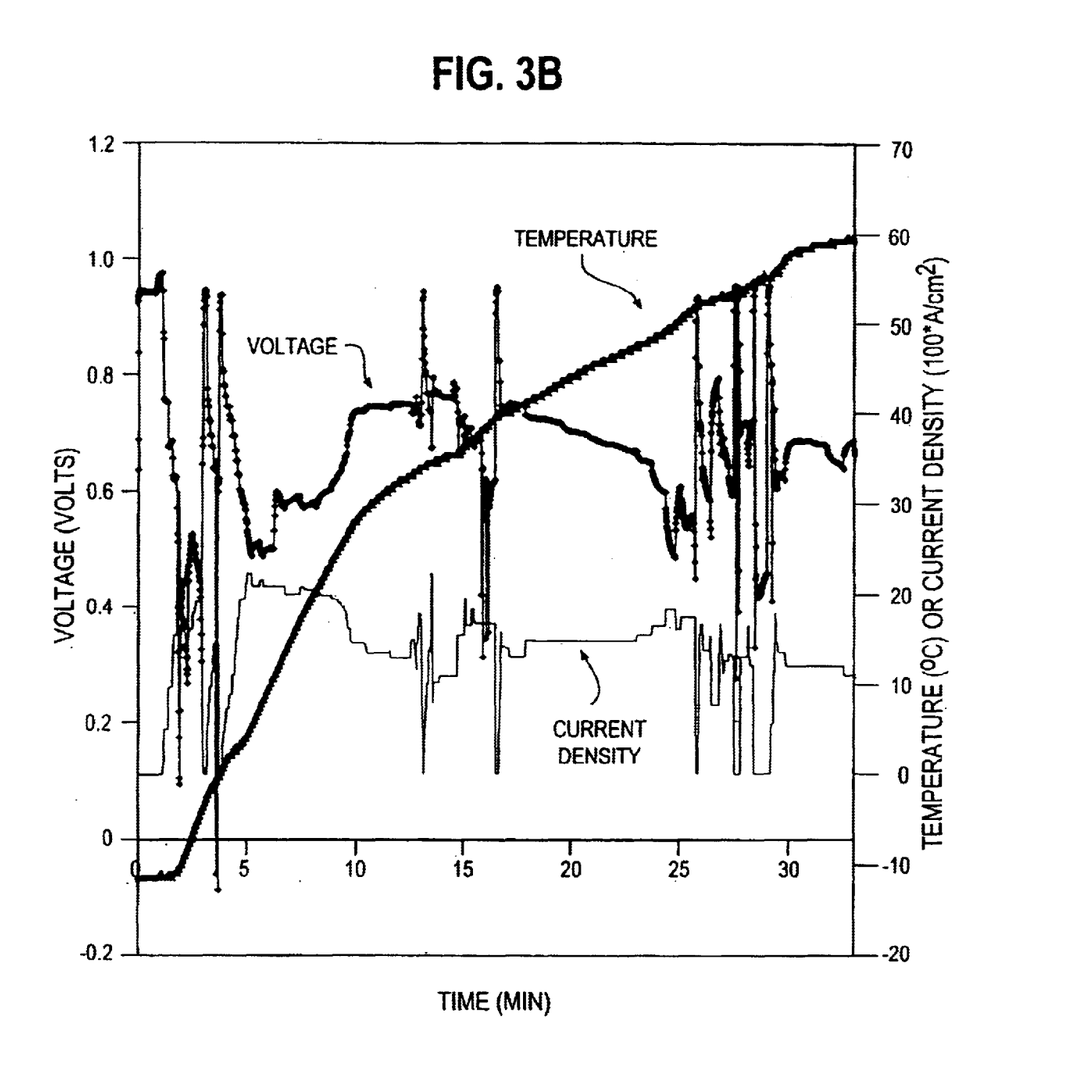

Stack F, which was subjected to intermittent oxidant starvations during start-up, showed an improvement over stack E in that a higher maximum current density was reached during the starting period of 35 minutes. However, neither stack reached a current density of 0.5 A/cm$^2$, presumably as a result of severe anode poisoning. FIGS. 3A and 3B are plots of representative cell voltages, current densities and temperatures as a function of time for fuel cells F and E, respectively.

Figure 4A:
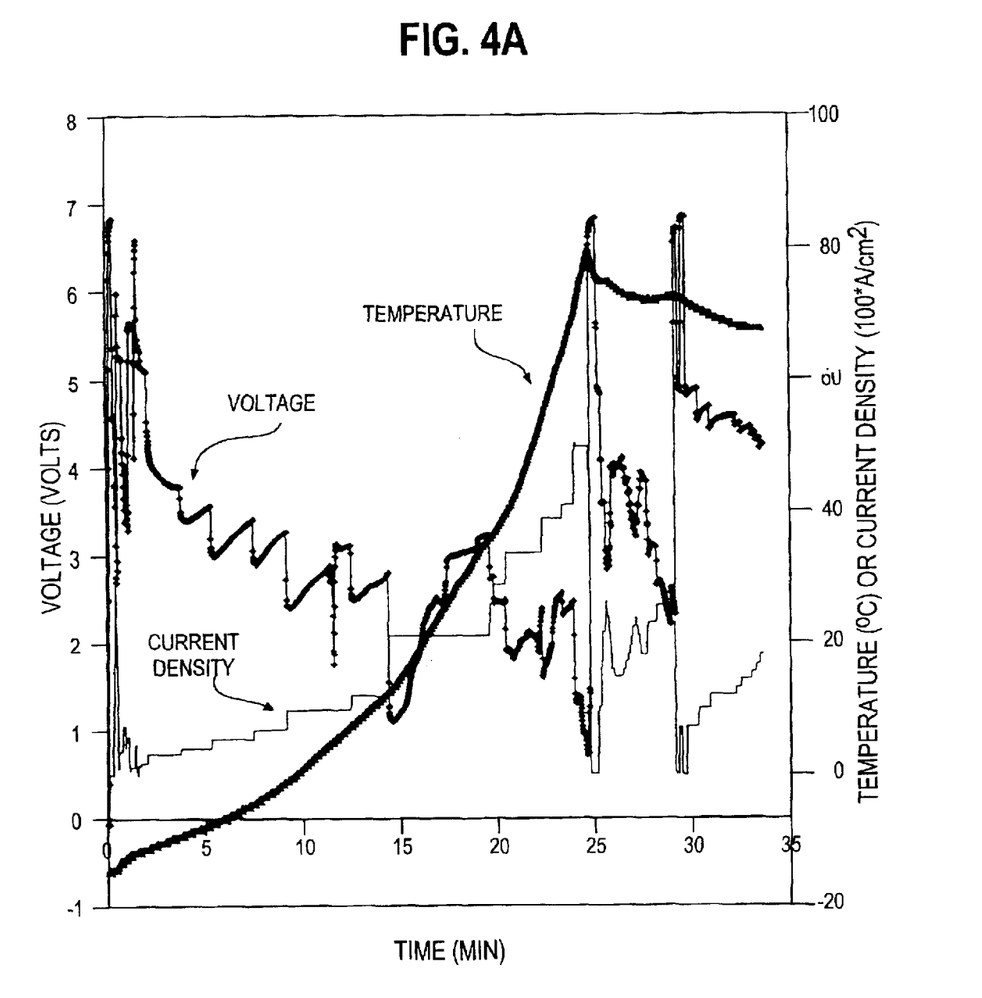
FIGS. 4A, 4B and 4C are plots of representative cell voltages, current densities, and temperatures as a function of time in fuel cells in 7-cell stacks started up from −15° C. using (in plot A) pure hydrogen as fuel and no starvation method, (in plot B) pure hydrogen as fuel and a prolonged connection of an additional electrical load to effect starvation, and (in plot C) reformate as fuel and a prolonged connection of an additional electrical load to effect starvation.
Figure 4B:
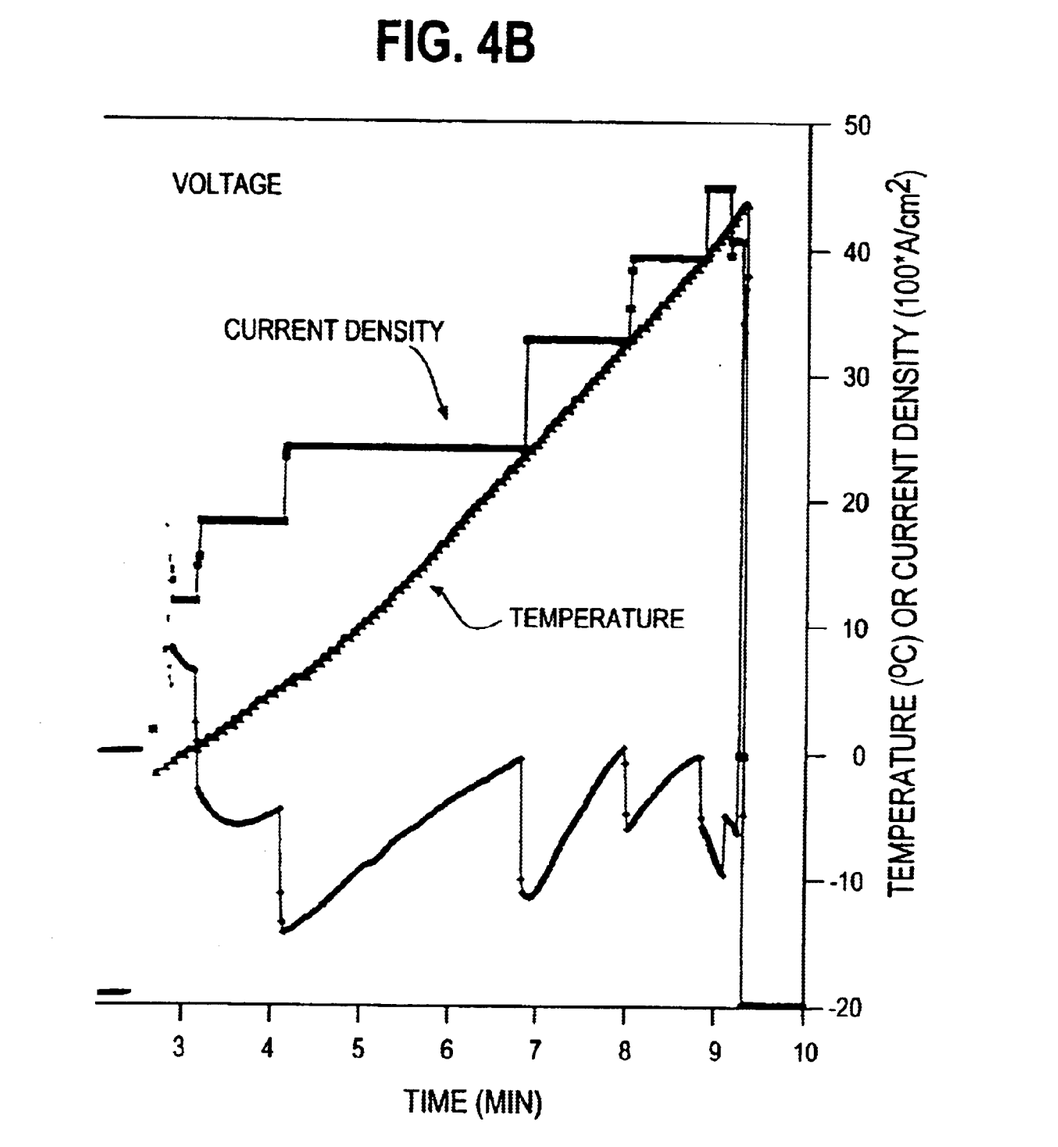
Figure 4C:
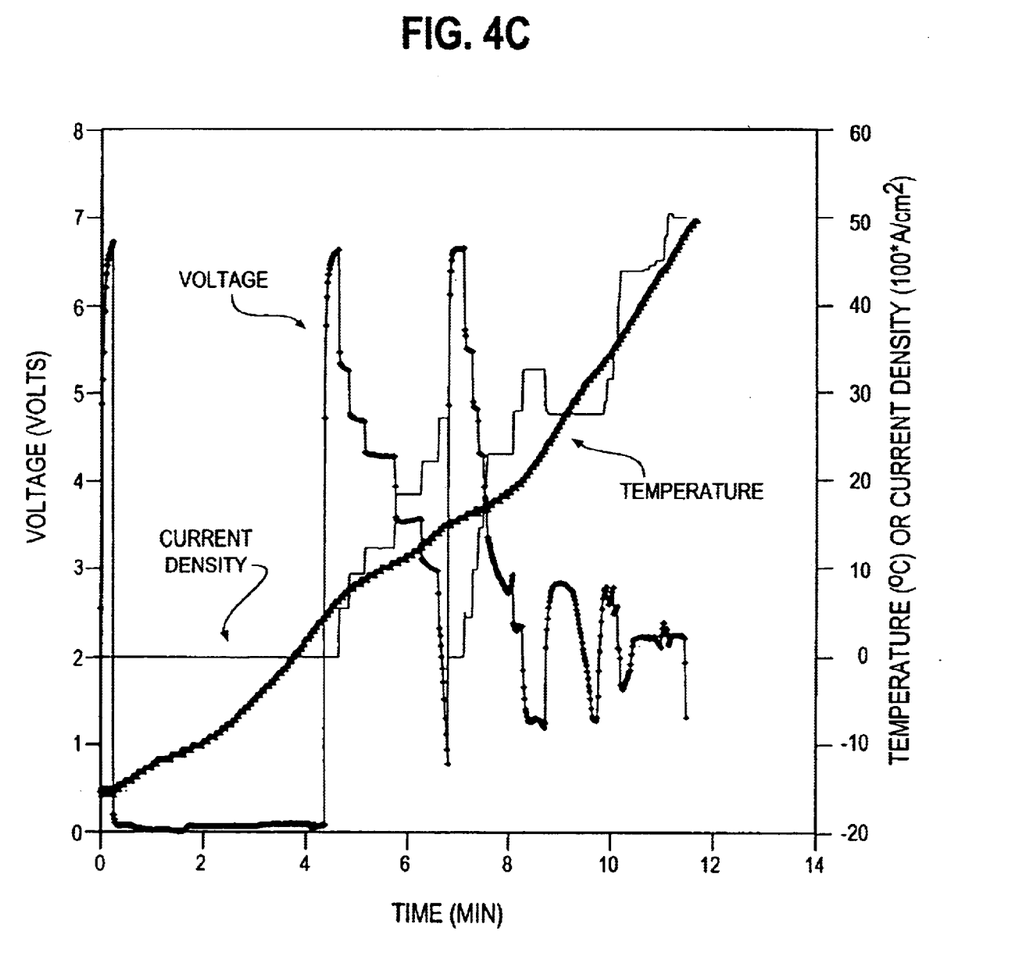

The prolonged connection of an additional electrical load significantly reduced the time taken for a 7-cell stack supplied with pure hydrogen fuel to reach a current density of 0.5 A/cm$^2$ from −15° C. (compare stack H to stack G). Similar reduced times were also observed on stacks supplied with CO-containing reformate fuel (stacks I and J) when this method was used during the start-up period. Thus, this method not only reduces the start-up period, but also reduces the adverse effects of carbon monoxide poisoning. FIGS. 4A, 4B and 4C are plots of representative cell voltages, current densities, and temperatures as a function of time for fuel cell stacks G, H, and I respectively.

Figure 4D:
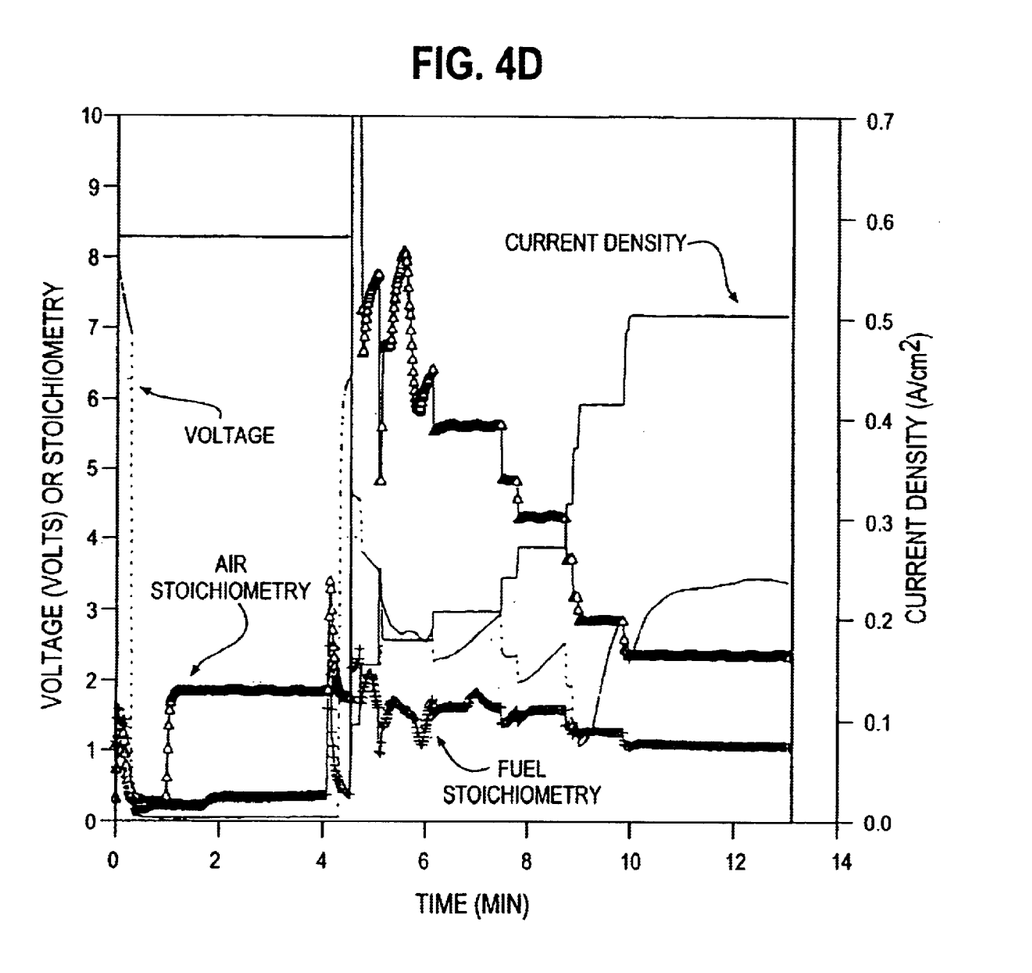
FIG. 4D is a plot of representative cell voltage, current density, fuel stoichiometry and oxidant stoichiometry as a function of time in fuel cells in a 7-cell stack started up from −15° C. using reformate as fuel and a prolonged connection of an additional electrical load to effect starvation.

FIG. 4D is a plot of representative cell voltage, current density, fuel stoichiometry, and oxidant stoichiometry as a function of time for fuel cell stack J. (In FIG. 4D, the fuel and oxidant stoichiometry data were determined by logging reactant flow rates and output current over time using a data acquisition unit. The amount of reactant consumed per unit time was then calculated based on one mole of hydrogen fuel and half a mole of oxygen oxidant being consumed for every two electrons generated. During the shorting period where the additional electrical load was applied, the reactant flow rates were also logged but the larger output current was not logged continuously. Instead, a constant output current value was assumed based on a single point determination of the current measured from a similar cell operating under similar conditions. While it is not expected that the output current was actually constant during this period, it is expected that this output current was obtained for at least some length of time during the shorting period.) As shown in FIG. 4D, both the fuel and air stoichiometries were much less than 1 during the first minute of shorting. The air supply flow rate was then increased, thereby increasing the air stoichiometry. After 4 minutes, a substantial voltage reversal occurred in one of the cells in the stack (approximately −2 V) and the flow rates of both the air and fuel were increased in order to alleviate the reversal. Shortly thereafter the shorting was stopped.

To find out if use of such reactant starvation methods damaged the fuel cell membranes in the preceding tests, the leak rate of test gas through the membranes was determined both before and after use of the starvation methods. The leak rate before was very small and no significant change in the leak rate was observed after starvation. Polarization tests (i.e., cell voltage at a current density of interest) were also performed on the fuel cells and stacks both before and after use of the starvation methods. The polarization characteristics after use of the starvation methods on start-up were similar to those before start-up.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications which incorporate those features coming within the scope of the invention.

What is claimed is:

1. A method of operating a solid polymer electrolyte fuel cell comprising:
   supplying an oxidant reactant stream to the cathode electrode of said fuel cell;
   supplying a fuel reactant stream to the anode electrode of said fuel cell;
   monitoring a temperature parameter indicative of the operating temperature of said fuel cell; and
   when said temperature parameter is below a predetermined threshold value, reactant starving at least a portion of one of said electrodes.

2. The method of claim 1 wherein said reactant starving is intermittent.

3. The method of claim 1 wherein said reactant starving comprises interrupting the supply of one of said reactant streams to said respective fuel cell electrodes.

4. The method of claim 3 wherein said method comprises intermittently interrupting the supply of one of said reactant streams to said fuel cell electrodes.

5. The method of claim 3 wherein said one of said reactant streams is said fuel reactant stream.

6. The method of claim 3 wherein said one of said reactant streams is said oxidant reactant stream.

7. The method of claim 3 wherein said fuel cell is one of a plurality of fuel cells arranged in a fuel cell stack.

8. The method of claim 7 wherein said supply of one of said reactant streams to each of said plurality of fuel cells is not simultaneously interrupted.

9. The method of claim 1 wherein said method comprises connecting a transient electrical load to draw electrical power from said fuel cell.

10. The method of claim 9 wherein said method comprises intermittently connecting a transient electrical load to draw electrical power from said fuel cell.

11. The method of claim 9 wherein the rates of supply of said reactants to said fuel cell electrodes are not increased in response to the connection of said transient load.

12. The method of claim 9 wherein said fuel cell is one of a plurality of fuel cells arranged in a fuel cell stack, and the connection of said transient load to draw power from each one of said plurality of fuel cells is not simultaneous.

13. The method of claim 1 wherein said reactant streams are essentially free of electrocatalyst poisons.

14. The method of claim 13 wherein said fuel reactant stream is substantially pure hydrogen.

15. The method of claim 2 wherein said fuel cell is one of a plurality of fuel cells arranged in a fuel cell stack and said reactant starving causes a voltage reversal to occur in at least one of said plurality of fuel cells.

16. The method of claim 9 wherein said fuel cell is one of a plurality of fuel cells arranged in a fuel cell stack and said reactant starving causes a voltage reversal to occur in at least one of said plurality of fuel cells.

* * * * *